United States Patent
Hatcher et al.

(10) Patent No.: US 11,556,768 B2
(45) Date of Patent: Jan. 17, 2023

(54) OPTIMIZATION OF SPARSIFIED NEURAL NETWORK LAYERS FOR SEMI-DIGITAL CROSSBAR ARCHITECTURES

(71) Applicant: Samsung Electronics Co., Ltd., Gyeonggi-do (KR)

(72) Inventors: Ryan Hatcher, Austin, TX (US); Titash Rakshit, Austin, TX (US); Jorge Kittl, Garland, TX (US); Dharmendar Palle, Austin, TX (US); Joon Goo Hong, Austin, TX (US)

(73) Assignee: Samsung Electronics Co., Ltd

( * ) Notice: Subject to any disclaimer, the term of this patent is extended or adjusted under 35 U.S.C. 154(b) by 456 days.

(21) Appl. No.: 16/849,638

(22) Filed: Apr. 15, 2020

(65) Prior Publication Data
US 2021/0133544 A1    May 6, 2021

Related U.S. Application Data

(62) Division of application No. 62/929,000, filed on Oct. 31, 2019.

(51) Int. Cl.
  *G06N 3/063* (2006.01)
  *G06N 3/02* (2006.01)
(52) U.S. Cl.
  CPC .............. *G06N 3/063* (2013.01); *G06N 3/02* (2013.01)

(58) Field of Classification Search
  CPC ..................................................... G06N 3/063
  See application file for complete search history.

(56) References Cited

U.S. PATENT DOCUMENTS

| | | | |
|---|---|---|---|
| 8,819,616 B2 | 8/2014 | Philip et al. | |
| 10,131,052 B1 | 11/2018 | Ibarz Gabardos et al. | |
| 10,366,322 B2 | 7/2019 | David et al. | |
| 2019/0188554 A1 | 6/2019 | Ma et al. | |
| 2019/0205358 A1 | 7/2019 | Diril et al. | |
| 2021/0133544 A1* | 5/2021 | Hatcher | G06N 3/063 |

OTHER PUBLICATIONS

Aayush Ankit, Abhronil Sengupta and Kashik Roy "TraNNsformer: Neural Network Transformation for memristive crossbar based neuromorphic system design" ICCAD 2017 . . . . (International Conference on Computer-Aided Design), pp. 8.

* cited by examiner

*Primary Examiner* — Todd Buttram
(74) *Attorney, Agent, or Firm* — The Farrell Law Firm, P.C.

(57) ABSTRACT

A method and system are provided. The method includes mapping a binary matrix to an undirected graph form, applying a two-way graph partition algorithm to the mapped binary matrix that minimizes edge cuts between partitions in the mapped binary matrix, applying a greedy algorithm recursively to find a set of row or column permutations that maximizes a transfer of non-zeros from sparse blocks to nonsparse blocks, and sparsifying or densifying the binary matrix according to the applied greedy algorithm.

20 Claims, 4 Drawing Sheets

OPTIMIZATION OF SPARSIFIED NEURAL NETWORK LAYERS FOR SEMI-DIGITAL CROSSBAR ARCHITECTURES

PRIORITY

This application is based on and claims priority under 35 U.S.C. § 119(e) to U.S. Provisional Patent Application filed on Oct. 31, 2019 in the United States Patent and Trademark Office and assigned Ser. No. 62/929,000, the entire contents of which are incorporated herein by reference.

FIELD

The present disclosure relates generally to a method and apparatus to permute a sparse matrix so that sub blocks are sparsified (or densified).

BACKGROUND

There is an increasing demand for hardware accelerators for machine learning (ML) applications. The computation that dominates many of these ML applications is matrix vector multiplications. Pruning methods have been demonstrated that are able to sparsify the layers, resulting in a large fraction of zero-valued elements. Sparse vector-matrix multiplication techniques for all-digital architectures have been developed that improve the power/performance of inference operations. For non-sparse matrices, it is possible to perform matrix vector multiplication very efficiently in analog through a crossbar network. However, for networks that have been pruned, the power savings are not typically realized in these analog or semi-analog crossbar networks as they are in all-digital designs because the overhead associated with powering up the arrays incurs overhead that is not reduced significantly, even if a large fraction of the weights are zeros. In order for there to be power savings, the zero-valued elements may be locally correlated.

SUMMARY

In one embodiment, a method includes mapping a binary matrix to an undirected graph form, applying a two-way graph partition algorithm to the mapped binary matrix that minimizes edge cuts between partitions in the mapped binary matrix, applying a greedy algorithm recursively to find a set of row or column permutations that maximizes a transfer of non-zeros from sparse blocks to nonsparse blocks, and sparsifying or densifying the binary matrix according to the applied greedy algorithm.

In one embodiment, a system includes a memory and a processor configured to map a binary matrix to an undirected graph form, apply a two-way graph partition algorithm to the mapped binary matrix that minimizes edge cuts between partitions in the mapped binary matrix, apply a greedy algorithm recursively to find a set of row or column permutations that maximizes a transfer of non-zeros from sparse blocks to nonsparse blocks, and sparsify or densify the binary matrix according to the applied greedy algorithm.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
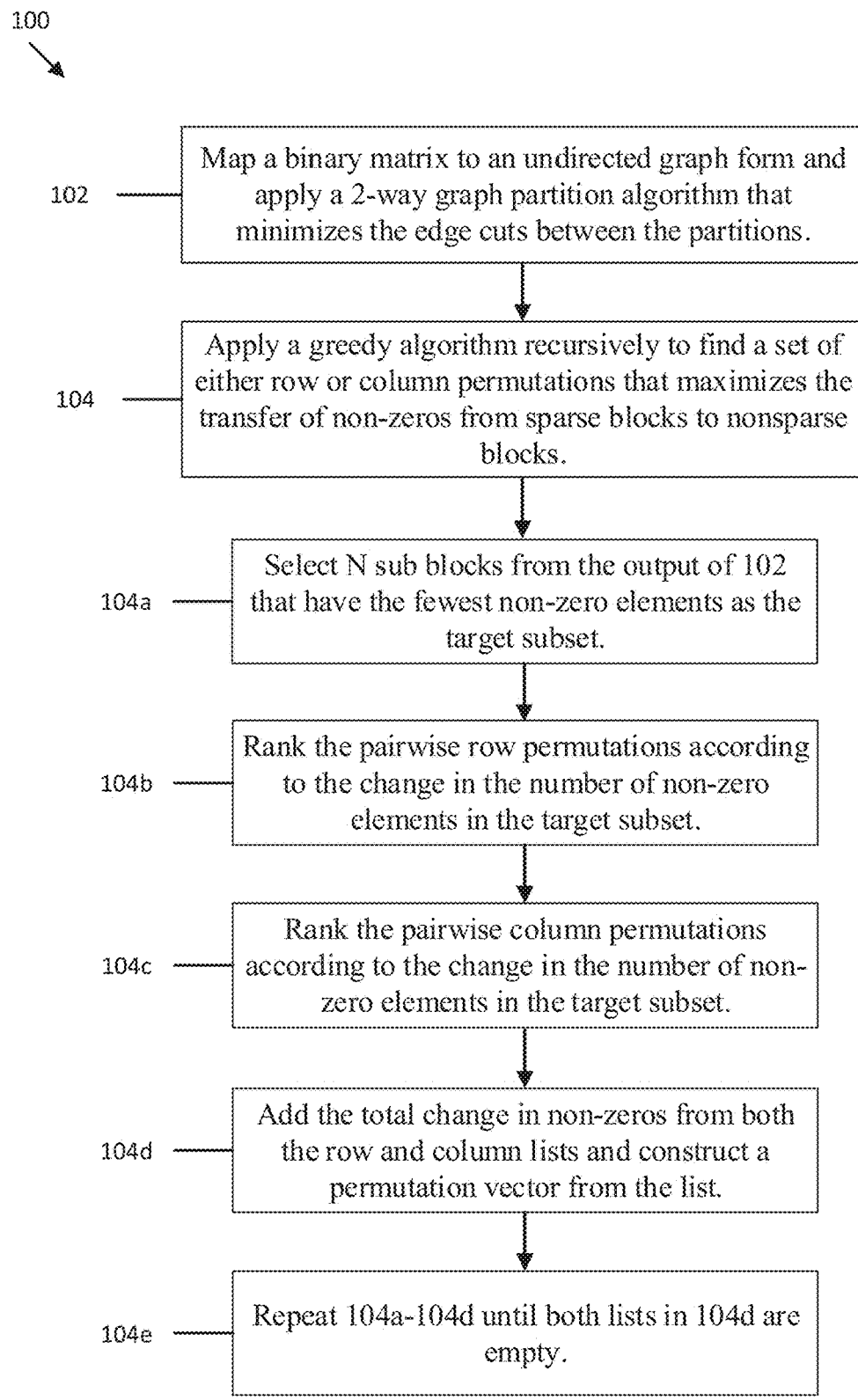
FIG. 1 illustrates a flowchart for permuting a sparse matrix, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method permute a sparse matrix so that sub blocks are sparsified (or densified). The present system and method may identify row and column permutation vectors that selectively sparsify or densify regions of a sparse matrix. For example, sparsifying one or more regions may result in other regions being densified, and vice versa. The present system and method may sparsify one or more regions resulting in one or more other regions being densified, and may densify one or more regions resulting in one or more other regions being sparsified. Given a sparse matrix with a significant fraction of zero-valued elements (e.g. 80% zeros), the matrix can be subdivided into sub blocks. The present system and method find the row and column permutation vectors that either increase or decrease the number of non-zero elements in some subset of sub blocks.

The present system and method generate local sparsity that can be leveraged to improve overall parallel prefix adder (PPA) on network on chip (NoC) architectures with crossbar architectures. It is assumed that the matrix associated with each layer can be decomposed into blocks and that the user will provide the information about how the matrix will be decomposed and how the target subset should be constructed. A matrix may be decomposed into square blocks of uniform size (given by the user) and the number of blocks that are to be sparsified is also provided by the user.

FIG. 1 illustrates a flowchart 100 for permuting a sparse matrix, according to an embodiment. At 102, the system maps a binary matrix to an undirected graph form and applies a 2-way graph partition algorithm that minimizes the edge cuts between the partitions. Step 102 may be a preconditioning step that sparsifies half of the matrix and densifies the other half. The system may binarize the matrix and perform a minimum cut (minicut) algorithm assuming a 2-way partition. The minicut algorithm may be a hypergraph minicut algorithm. One of skill in the art will understand minicut algorithms that may be utilized (e.g., from the METIS suite). The system may store the row and column permutation vectors corresponding to the minicut algorithm. k may equal 2.

At 104, the system applies a greedy algorithm recursively to find a set of either row or column permutations that maximizes the transfer of non-zeros from sparse blocks to nonsparse blocks.

At 104a, given a number of sub blocks that are to be sparsified, N, the system selects the N sub blocks from the output of step 102. The system may select the sub blocks that have the fewest non-zero elements as the target subset. The target subset of blocks may be of non-uniform size.

At 104b, the system may rank the pairwise row permutations according to the change in the number of non-zero elements in the target subset. The system may rank the row permutations based on the change from the least negative change to the most positive change. Any permutation on the list that results in a non-negative change or that includes a row from another permutation with a more negative change may be removed from the list.

At 104c, the system may rank the pairwise column permutations according to the change in the number of non-zero elements in the target subset. The permutations may be ranked from most negative to most positive. Any permutation on the list that results in a nonnegative change or that includes a column from another permutation with a more negative change may be removed from the list.

The ranking in 104b and 104c may include additional terms in the expansion of all possible permutations, in addition to the pairwise permutations of step 102. This may include both row and column permutations (e.g., the space over all simultaneous pairwise row and pairwise column permutations). Additionally, the number of row (column) permutations for a matrix with M rows (columns) is M!, which is intractable for an exhaustive search. However, by limiting the search space only to pairs of rows (columns), the total number of permutations is (M−1)(M−2), which is tractable to search exhaustively even for larger matrices of say thousands or tens of thousands of rows (columns). On large high performance computing (HPC) platforms, it may be possible to expand the search space to include more possible permutations (e.g., 3-way, 4-way, or even simultaneous sets of row/column, etc.), which should lead to even better results At 104d, the system may add the total change in non-zeros from both the row and column lists and construct a permutation from the lists (either the row list or the column list), where the total change is the most negative change. The system may apply this permutation vector to the previous respective vector (either the row vector or the column vector) in order to be able to reconstruct the sparsified matrix from the original.

At 104e, the system may repeat steps 104a through 104d until both lists produced at 104d are empty, meaning that no further improvement is possible. The target subset of blocks may change in each iteration. The subset with the least number of non-zeros may be selected. The system may use the real value of the matrix instead of binarizing it in 102. If the real values are negative, then the magnitude instead of the amplitude should be used in the calculation of the change in 104b and 104c.

Alternatively, in steps 104a through 104c, the system may maximize the number of non-zeros in the subset of target sub blocks. The ranking runs from most positive to least positive and those permutations that result in a net positive change in the number of non-zeros in the subset of target blocks are kept.

Figure 2:
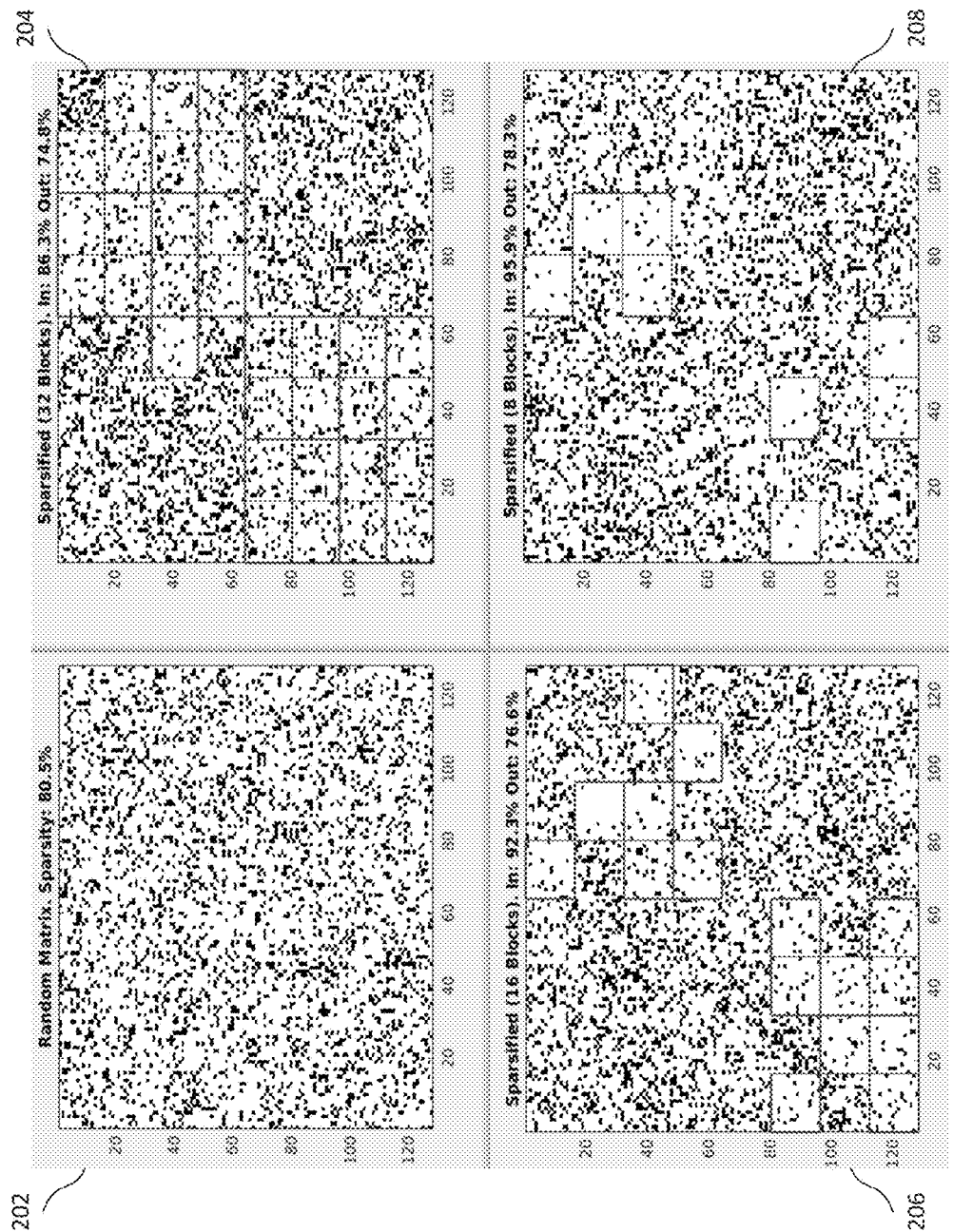
FIG. 2 illustrates a diagram of sparse matrices, according to an embodiment.
Figure 3:
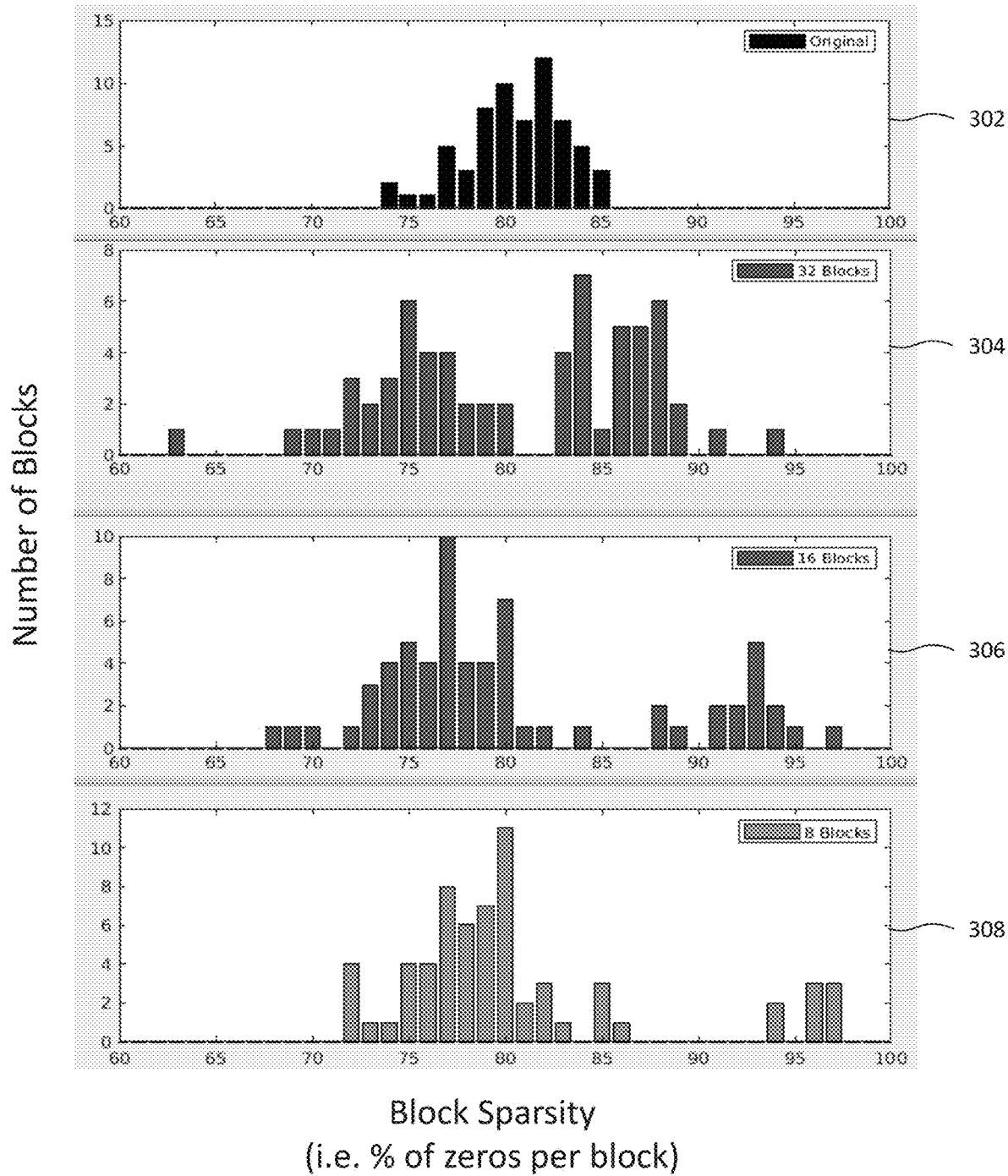
FIG. 3 illustrates graphs of block sparsity versus the number of blocks in a sparse matrix, according to an embodiment.

FIG. 2 illustrates a diagram of sparse matrices, according to an embodiment. FIG. 3 illustrates graphs of block sparsity versus the number of blocks in a sparse matrix, according to an embodiment.

As an example of the method described in FIG. 1, in FIG. 2, the random 128×128 matrix 202 is provided with 80% sparsity, and graph 302 shows the block sparsity versus the number of blocks. After applying steps 104a-104d of FIG. 1, the matrix 202 may be sparsified into matrix 204, with 32 blocks. Graph 304 shows the block sparsity versus the number of blocks in matrix 204. By repeating steps 104a-104d (i.e., step 104e), the matrix 204 may be further sparsified into matrix 206 with 16 blocks. Graph 306 shows the block sparsity versus the number of blocks in matrix 206. Further repeating the steps 104a-104d, the matrix 206 may be further sparsified into matrix 208, with 8 blocks. Graph 308 shows the block sparsity versus the number of blocks in matrix 208.

Figure 4:
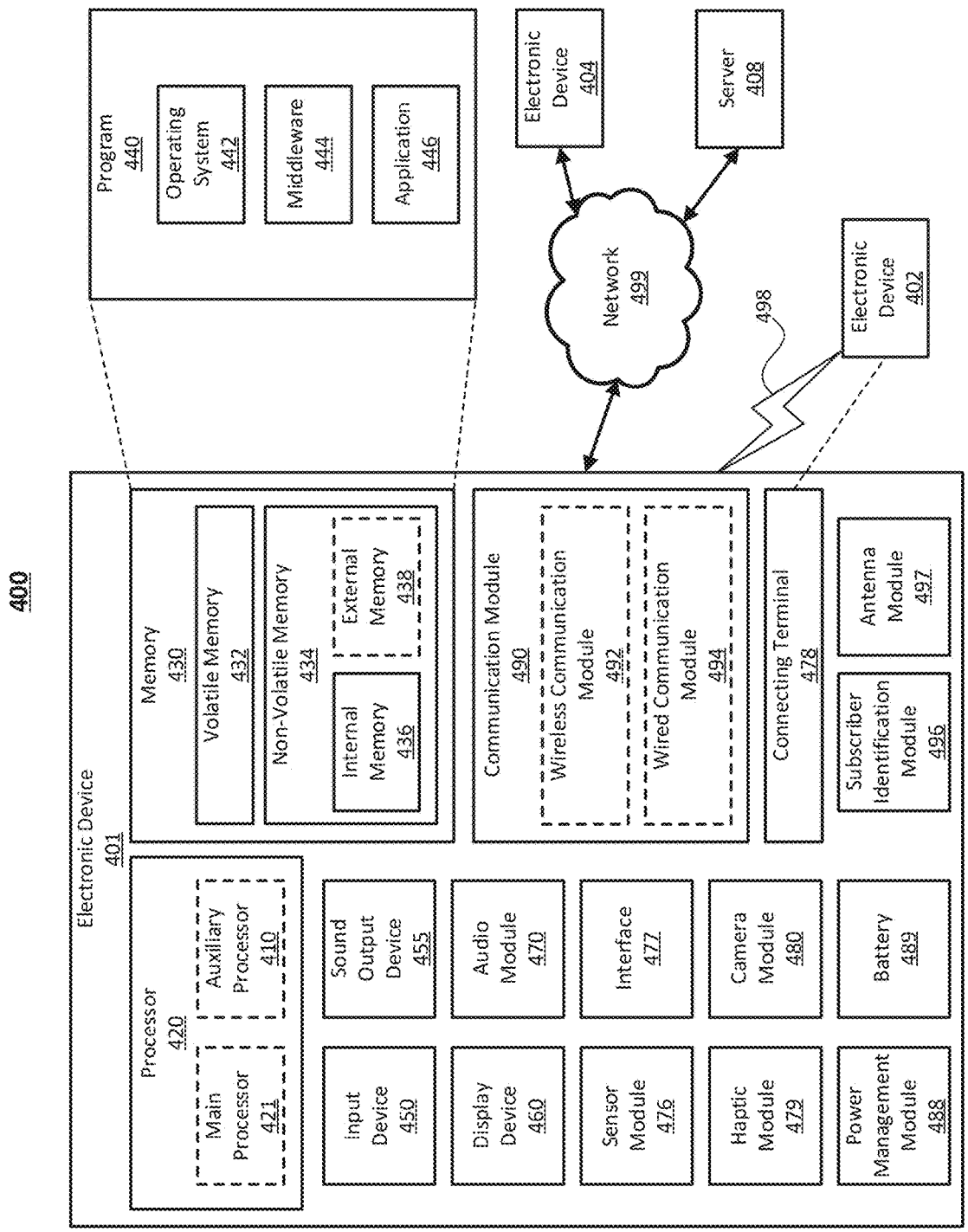
FIG. 4 is a block diagram of an electronic device in a network environment, according to one embodiment.

FIG. 4 is a block diagram of an electronic device 401 in a network environment 400, according to one embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an ISP or a CP) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wired) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wired) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, ISPs, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
mapping a binary matrix to an undirected graph form;
applying a two-way graph partition algorithm to the mapped binary matrix that minimizes edge cuts between partitions in the mapped binary matrix;
applying a greedy algorithm recursively to find a set of row or column permutations that maximizes a transfer of non-zeros from sparse blocks to nonsparse blocks; and
sparsifying or densifying the binary matrix according to the applied greedy algorithm.

2. The method of claim 1, wherein the two-way graph partition algorithm includes a minicut algorithm.

3. The method of claim 2, wherein the minicut algorithm is a hypergraph minicut algorithm.

4. The method of claim 1, wherein applying the greedy algorithm further comprises selecting N sub blocks having a lowest number of non-zero elements as a target subset.

5. The method of claim 4, further comprising ranking pairwise row permutations according to a change in the number of non-zero elements in the target subset.

6. The method of claim 5, wherein the pairwise row permutations are ranked based on a change from least negative change to most negative change.

7. The method of claim 5, further comprising ranking pairwise column permutations according to the change in the number of non-zero elements in the target subset.

8. The method of claim 7, wherein the pairwise column permutations are ranked based on a change from least negative change to most negative change.

9. The method of claim 7, further comprising adding a total change in non-zeros from both a row list and a column list and constructing a permutation vector.

10. The method of claim 9, further comprising repeating the ranking of the row permutations, the ranking of the column permutations, the adding of the total change, and the constructing of the permutation vector steps until the row list and the column list are empty.

11. A system, comprising:
a memory; and
a processor configured to:
map a binary matrix to an undirected graph form;
apply a two-way graph partition algorithm to the mapped binary matrix that minimizes edge cuts between partitions in the mapped binary matrix;
apply a greedy algorithm recursively to find a set of row or column permutations that maximizes a transfer of non-zeros from sparse blocks to nonsparse blocks; and
sparsify or densify the binary matrix according to the applied greedy algorithm.

12. The system of claim 11, wherein the two-way graph partition algorithm includes a minicut algorithm.

13. The system of claim 12, wherein the minicut algorithm is a hypergraph minicut algorithm.

14. The system of claim 11, wherein applying the greedy algorithm further comprises selecting N sub blocks having a lowest number of non-zero elements as a target subset.

15. The system of claim 14, wherein the processor is further configured to rank pairwise row permutations according to a change in the number of non-zero elements in the target subset.

16. The system of claim 15, wherein the pairwise row permutations are ranked based on a change from least negative change to most negative change.

17. The system of claim 15, wherein the processor is further configured to rank pairwise column permutations according to the change in the number of non-zero elements in the target subset.

18. The system of claim 17, wherein the pairwise column permutations are ranked based on a change from least negative change to most negative change.

19. The system of claim 17, wherein the processor is further configured to add a total change in non-zeros from both a row list and a column list and construct a permutation vector.

20. The system of claim 19, wherein the processor is further configured to repeat the ranking of the row permutations, the ranking of the column permutations, the adding of the total change, and the constructing of the permutation vector steps until the row list and the column list are empty.

* * * * *